May 30, 1950     R. E. ROBERTS     2,509,528
APPARATUS FOR COVERING BALLS Filed Jan. 30, 1947     6 Sheets-Sheet 1

INVENTOR.
ROBERT E. ROBERTS
BY
Bates, Teare & McBean
ATTORNEYS

May 30, 1950  R. E. ROBERTS  2,509,528
APPARATUS FOR COVERING BALLS
Filed Jan. 30, 1947  6 Sheets-Sheet 2

FIG.-5

INVENTOR.
ROBERT E. ROBERTS
BY
Bates, Teare & McBean
ATTORNEYS

May 30, 1950 — R. E. ROBERTS — 2,509,528
APPARATUS FOR COVERING BALLS
Filed Jan. 30, 1947 — 6 Sheets-Sheet 4

INVENTOR.
ROBERT E. ROBERTS
BY
Bates, Teare, v McKean
ATTORNEYS

Fig. 16

May 30, 1950 R. E. ROBERTS 2,509,528
APPARATUS FOR COVERING BALLS
Filed Jan. 30, 1947 6 Sheets-Sheet 6

Fig. 17

INVENTOR.
Robert E. Roberts
BY
Bates, Teare y McBean
ATTORNEYS

Patented May 30, 1950

2,509,528

UNITED STATES PATENT OFFICE 2,509,528

APPARATUS FOR COVERING BALLS

Robert Eldon Roberts, Ridgefield, Conn.

Application January 30, 1947, Serial No. 725,214

36 Claims. (Cl. 154—16)

This invention relates to an improved apparatus for applying covers to balls and the like, and more particularly to an improved apparatus for applying the usual pair of figure-eight shaped cover members to a tennis ball. These, therefore, are the general objects of the present invention.

One of the problems in covering tennis balls is that of positioning a pair of tacky cement or adhesive-coated cover members accurately upon a rubber ball or center so that the cemented covers do not touch each other before the bodies of the covers are joined adhesively to the ball and, without wrinkling or stretching the cover member. When the covers are cut so that their combined area is less than the surface area of the ball, it is important that the covers be applied so that the open space or cement seam between the cover members is of the same width throughout its entire length.

Generally, in the past, the combined area of the cover members has been greater than the surface area of the ball to which they are to be applied. This is because the cover members are usually cut with a predetermined fullness to allow for shrinkage when they are subsequently vulcanized to the ball. Under such condition the difficulties encountered in attaching the covers to the ball are greatly increased, and there is danger of entrapping air in various areas under the cover. Accordingly, it is an object of the present invention to provide an apparatus for overcoming the problems above mentioned and for efficiently and economically applying the cover members snugly to the ball.

Due to the difficulties encountered in covering tennis balls, the covers generally have been applied at least partially, to the ball by a manual operation. Therefore, a further object of this invention is to provide a mechanical means which will automatically apply the cover members to a ball, so that they will be accurately positioned relative to each other and so that they will not touch each other before the body and edges of the respective cover members have been rolled down and adhesively joined to the surface of the ball.

Other objects and advantages of the present invention will become more apparent from the following description, reference being made to the accompanying drawings, which illustrate a preferred form of apparatus for mechanically affixing the covers to the balls. The essential features of the invention will be summarized in the claims.

My improved method of covering tennis balls or the like contemplates placing a pair of cover members on a platen in such positions that a ball placed on the platen may be rolled across one of the covers. Either the ball, or the covers, or both, may be coated with a tacky cement or adhesive, so that the rolling of the ball across a cover member will cause the cover to adhere to the ball.

The ball may be pressed into contact with the cover during the rolling action with sufficient force to distort the ball and cause it to adhere to the cover throughout the entire width of the cover, or the platen may be provided with an elongated cover receiving cavity having a cross section curved to fit the ball in which case the ball need not be distorted during the rolling action, or the cavity may be of less curvature than the ball and the ball distorted to compensate for the difference of such curvatures.

Preferably the cover members and ball are placed on the platen so that the ball may be rolled across one cover member along its longest axis, until such cover member has been fully attached to the ball, and the rolling movement continued, along such axis extended, until the ball reaches a point either on the axis of the other cover or a point in alignment with the axis of the other cover. When, as in a tennis ball, the two cover members extend at right angles to each other, the covers are placed on the platen at right angles to each other, as for instance, in a T or L-shaped formation with one cover forming the vertical leg and the other cover forming the cross or base member of the formation.

In covering a tennis ball by using a T formation of covers the ball may be rolled across one cover until a point on the ball midway between the ends of the cover, so applied, reaches a point on the longitudinal center line of the second cover midway between the ends thereof, whereupon the movement of the ball is stopped and the ends of the second cover wrapped about the ball. Obviously this procedure may be reversed, that is, the ball may be positioned on the midpoint of the cover forming the cross of the T and such cover wrapped about the ball, and then the ball may be rolled across the cover forming the leg of the T to pick up and apply the second cover.

When a tennis ball is to be covered by using an L-shaped formation, the ball is rolled across a cover forming one leg of the L until such cover has been picked up by the ball, and this rolling movement continued until a point on the ball, midway between the ends of the cover so applied, intersects the axis extended of the second cover. The second cover is spaced from this point of intersection a distance such that when the ball is rolled along the axis of the second cover member, such cover will be properly positioned on the ball.

The method of application above described is well adapted to efficient operation where the combined areas of the cover members is less than the total surface area of the ball to be covered. Where, however, the cover members are cut full, to allow for shrinkage during a vulcanizing operation, an additional operation is performed simultaneously with the application of the cover members so as to avoid contact between the cover members during their application to the ball.

The additional operation referred to comprises distorting the ball by applying pressure to the ball in diametrically opposed regions at right angles to the plane of the rolling or wrapping action. Sufficient pressure is applied to the ball to cause an enlargement of the surface area of at least that portion of the ball to which a cover member is to be attached. This enlargement is such that the ball area to be covered is at least as great as the area of the cover member to be applied and preferably greater so that when the pressure is released the cover member will be compacted to an area not greater than the area the cover member will have when shrunk by the subsequent vulcanization process.

My improved method of covering tennis balls and the like, as above generally outlined, is diagrammatically illustrated in Figs. 2, 3, 4 and 10 to 14 inclusive. As there shown it will be noted that a pair of cover members C and D are placed in a T formation upon a substantially flat surface, such as a platen E. The covers illustrated, comprise the usual figure-eight shaped members. The ball B is placed on this surface at a point spaced from and in alignment with, the longitudinal axis of the cover member C, thus forming the leg of the T and, at the end thereof. Either the ball B, or the upper surfaces of the cover members, or both, may be coated with a tacky coating of cement or adhesive prior to being placed in position on the platen E.

Figure 10:
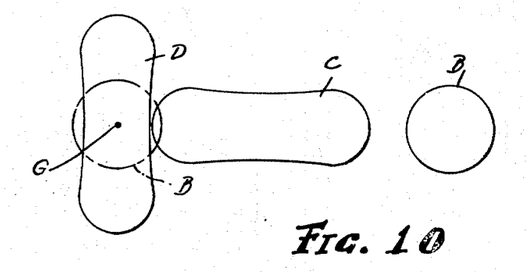
Figs. 10 to 14 inclusive are diagrams illustrating the method of applying the covers to the balls, Figs. 12 and 14 being end views of Figs. 11 and 13 respectively.
Figure 11:
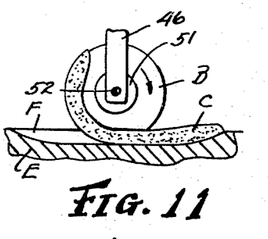
Figure 12:
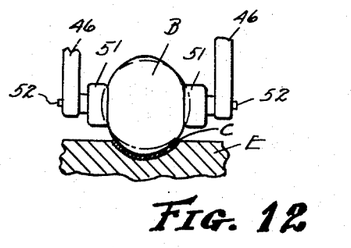
Figure 13:
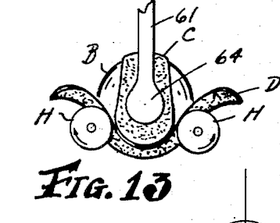
Figure 14:
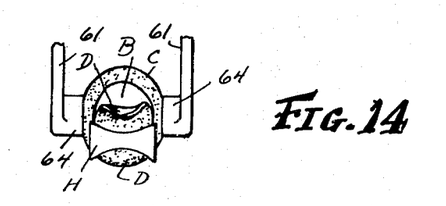

The ball B is now rolled along the longitudinal axis of the cover member C, until it reaches a position indicated by the character G, where the axis extended of the cover C intersects the mid-point of the axis of the cover D which forms the cross of the T. During the rolling action, above described, the ball is held in contact with the cover D with sufficient pressure to cause the cover to be wrapped securely around the ball.

If desired the platen E may have a concavity F simulating the curvature of the ball so that the cover member will be securely attached to the ball by the rolling action of the ball thereacross. The pressure, with which the ball is held in contact with the cover member, is such as will cause the ball to contact the cover throughout its entire width, and hence depends upon the difference between the curvature of the ball and the curvature of the platen portion upon which the cover rests.

After the ball has reached the position G on the cover D, the ball is firmly thrust against that cover and held in such position while a pair of rollers H roll the ends of the cover member D into contact with the ball. Thereafter, the ball is surrounded by an annulus or rigid band J (Fig. 4), the internal surface of which substantially forms a spherical segment having a diameter sufficiently large to enable the annulus to be dropped around the ball without contacting the covers.

Figure 4:
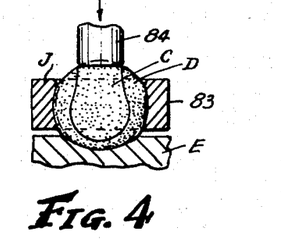

Thereafter the ball is expanded by pressure applied to the polar regions, as indicated in Fig. 4, to force the covers into contact with the internal surface of the ring J. This ring crosses the seams of the ball, as indicated in Fig. 4, and removes any wrinkles that might exist in the cover as a result of the previous operations. The covers are then vulcanized to the ball in the usual manner to set the cement, which is of a vulcanizable material.

Figure 15:
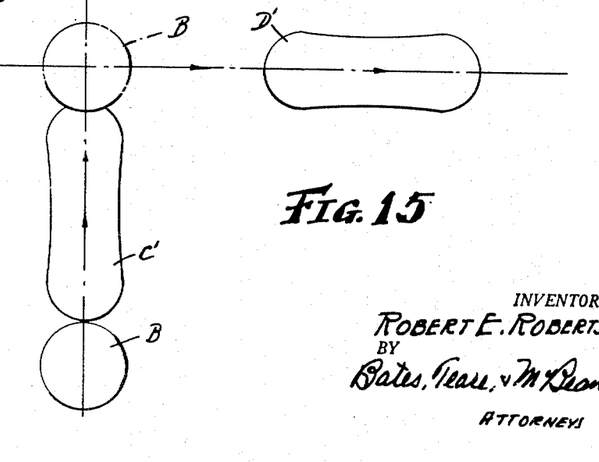
Fig. 15 is a diagrammatic illustration of a modified form of the method.

The second cover member D may be wrapped about the ball, as above described, or the ball may be rolled across this cover member in a manner similar to that used for the application of the cover member C. In the latter instance the cover members C and D are placed in an L-shaped formation on the table, as indicated in Fig. 15, and the ball is placed in alignment with, and along the axis of the cover $C^1$ and rolled across such cover member to a position where a point on the uncovered portion of the ball, midway between the ends of the cover $C^1$, intersects the axis of the cover $D^1$, whereupon the ball may be rolled along the axis of the latter cover $D^1$, which lies at right angles to the axis of the cover $C^1$. This results in picking up the cover $D^1$ and attaching it to the ball in the same manner as heretofore described in connection with the cover C.

However, I regard it as preferable to place the covers in the T formation, shown in Fig. 10, and wrap the second cover about the ball, as this reduces the size of the platens when the operations are mechanically performed.

Figs. 1, and 5 to 9 inclusive, illustrate an improved apparatus for covering tennis balls and the like and is particularly well adapted for covering balls by my improved method. This apparatus comprises a frame 10 having a vertically extending, centrally located shaft 11, which is rotatably supported in bearings 12. Secured to the upper end of the shaft 11, is a spider formation 14 having six arms 15, each of which carries a platen E hereinafter to be more fully described. The spider 14 is power driven. As shown in Fig.

Figure 5:
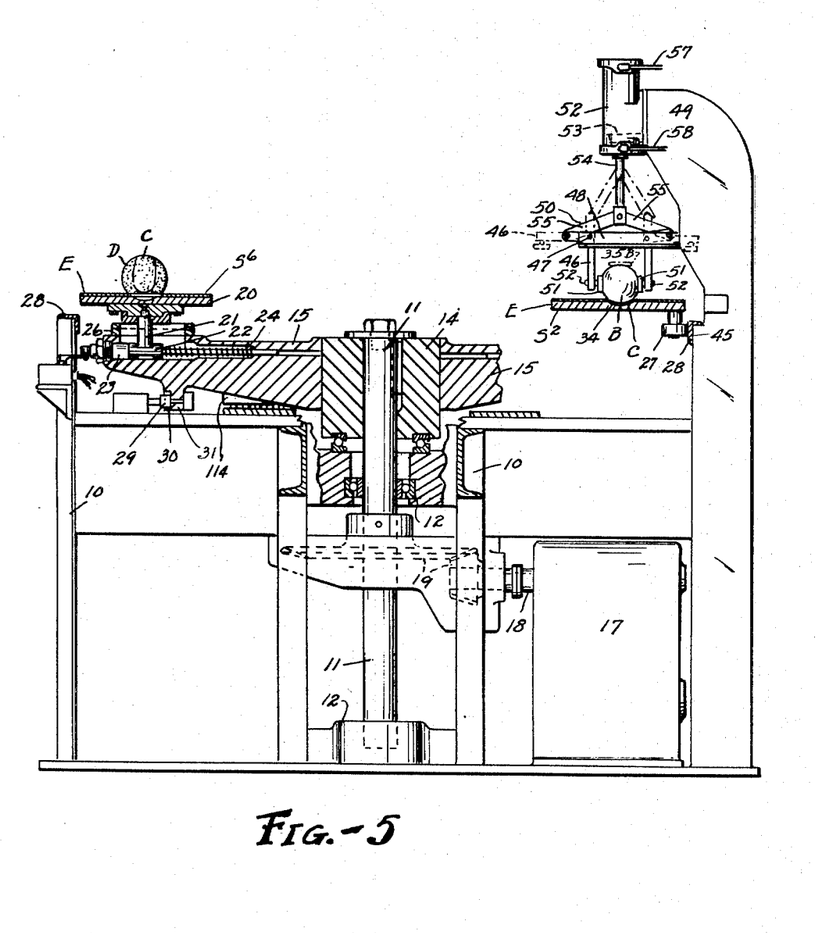
Fig. 5 is a vertical section through the apparatus illustrated in Fig. 1, the plane of the section being indicated by the offset line 5—5 on such figure.

5, there is provided a combined motor and gear reduction unit 17 having its power shaft 18 drivingly connected by beveled gearing 19 with the shaft 11. The motor unit is controlled as hereinafter more fully described.

Each platen member E is secured to a support 20 which is rotatable about a vertically extending spindle 21 carried by a slide block 22. Each block 22 is slidably mounted in a radially extending groove or slot 23 formed in its respective spider arm 15. Springs 24 act against respective blocks 22 and continuously urge them outward toward the periphery of the spider. The radial movement of each platen E is guided by a dovetail way formation 25 (Fig. 8) formed on a member 26 which is secured to the spider.

The platens E are, therefore, movable radially outward from the axis of the spider 14, and are rotatable about a vertical axis which is parallel with the axis of the spider.

Figure 1:
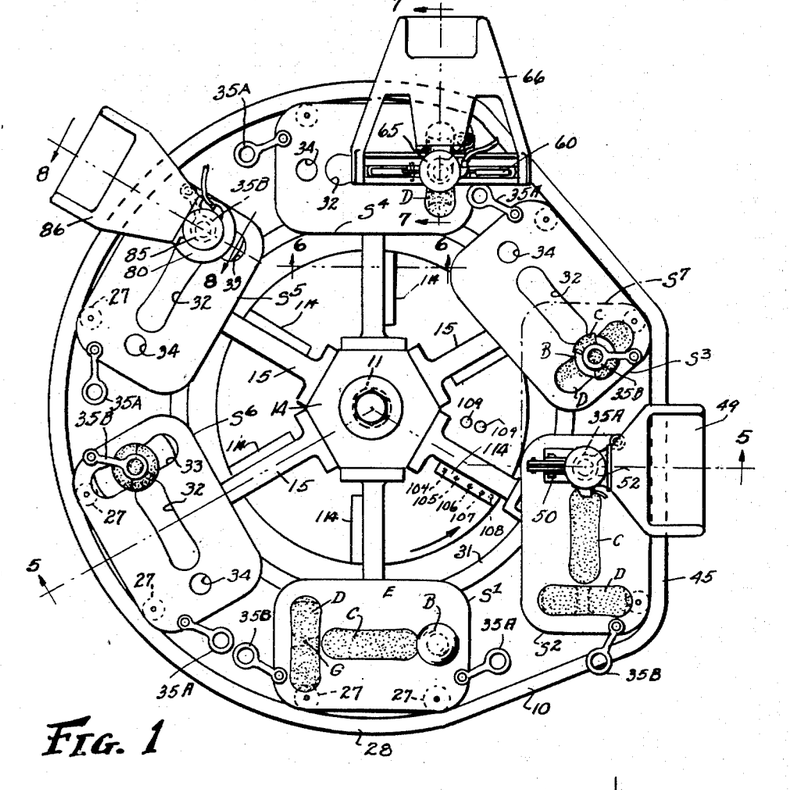
Fig. 1 is a plan view of an improved apparatus which is especially adapted to apply a pair of cover members to a ball in accord with my improved method.

The movement of each platen member E is controlled by a pair of spaced rollers 27 which are mounted on the underside of the respective platen E. As indicated in Figs. 1 and 5, these rollers are arranged to coact with a cam rail 28 carried by the frame 10. Thus the platens are controlled to move in an arcuate path, throughout a portion of their travel around the axis of the spider 14, and in a straight line path during other portions of their travel.

The spider 14 is intermittently driven, as hereinafter more fully described, so that each one of the platen members comes successively to a stop at each of the seven stations positioned about the periphery of the spider 14. Six of these stations are indicated in full lines in Fig. 1 and are designated by reference characters $S^1$, $S^2$, $S^3$, $S^4$, $S^5$ and $S^6$ while an intermediate station between stations $S^2$ and $S^3$ is indicated by the character $S^7$.

The spider 14 may be accurately stopped in each one of the positions above-mentioned by a series of spring-pressed latch members 29 carried by the frame 10 and arranged to engage indexing recesses 30 formed in a ring 31, which is secured to, or formed integral with, the arms of the spider 14. The latches 29 also serve to initiate the operation of various electrical circuits which control the machine, as will be hereinafter more fully described in connection with the electrical diagram of Figs. 16 and 17.

The platens E are each provided with a pair of depressions 32 and 33 each of which has substantially the same outline as the cover member C or D. These depressions extend at right angles to each other in a T-shaped formation, with the axis extended of the depression 32 intersecting the mid-point of the axis of the depression 33, so that the cover members C and D substantially abut each other. At the end of the depression 32, at the base of the T a small depression 34 is provided. The depression 34 is aligned with the axis of the depression 32, and is arranged to receive the ball B.

Whenever a platen E comes to rest at the station $S^1$ (Fig. 1), the operator places a cover member C in the depression 32, a second cover member D in the depression 33, and a ball B, to be covered, in the depression 34. The depression 32 may be concave in cross section, the degree of concavity being equal to, or less than the degree of curvature of the ball to be covered, the greater the degree of this concavity the less the pressure required to retain the ball in contact with the cover throughout its entire width.

Figures 6, 7, 8:
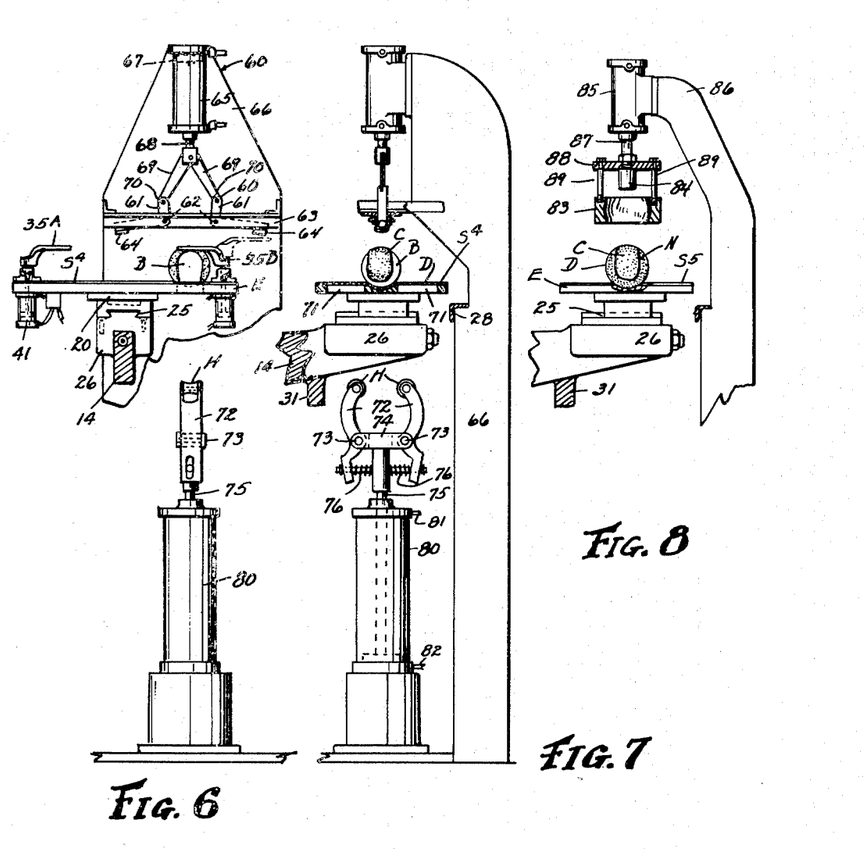
Figs. 6, 7 and 8 are fragmentary vertical sections through the apparatus of Fig. 1, the planes of the sections being indicated by the correspondingly numbered lines on Fig. 1.
Figure 9:
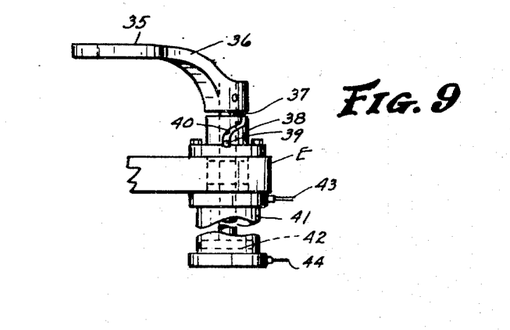
Fig. 9 is a detail illustrating a hold-down or clamping mechanism for retaining the balls in position on the apparatus.

When the cover members and ball have been positioned on the platen E, at the station $S^1$, shown in Fig. 1, the ball is securely clamped in position in the depression 34 by a clamp 35A. This clamping is best shown in Figs. 1, 6 and 9. Upon inspection of these figures it will be noted that the clamp is arranged to swing from a disengaging position, shown by the full lines in Fig. 1 and dotted lines in Fig. 6, to a ball-engaging position, shown by the dotted lines in Fig. 1 and full lines in Fig. 6.

Each clamp 35 comprises an arm 36 which is secured to a rod 37 which is rotatably and reciprocably mounted in a bearing 38 carried by its respective platen E. The shaft 37 carries a pin 39 which rides in a cam slot 40 formed in the bearing so that when the rod 37 is raised or lowered, to bring the clamp into or out of vertical contact with the ball, it is also swung about the axis of the rod 37 to and from a position above the ball.

The clamps 35 are each operated by an independent hydraulic mechanism, such as a cylinder 41 secured to the underside of the platen E and containing the usual piston 42 to which the rod 37 is secured. Conduits 43 and 44 convey the operating fluid to the cylinder 41 and are connected by flexible conduits with the spider, which, in turn, is connected by the usual flexible joint with an external source of fluid power.

The flow of fluid through the conduits 43 and 44 is controlled by a valve mechanism which will hereinafter be described in connection with the electrical diagrams of Figs. 16 and 17. Suffice it here to say that, when a ball has been positioned in the depression 34 of the platen E which is at station $S^1$, the right hand clamp 35 of such platen will swing from the full line position to the dotted line position (Fig. 1).

After the ball has been clamped to the platen E at station $S^1$ (Fig. 1), the spider is rotated to advance such platen to station $S^2$, and as the platen is advanced, it is swung about its pivot 21, until it is parallel with a straight portion 45 on the cam rail 28, and until the ball B, which rests in the depression 34 on the platen, is directly beneath a gripping mechanism 50, whereupon the movement of the spider 14 is stopped and the clamp 35 is swung out of contact with the ball.

The mechanism 50 grips the ball in regions other than those to be covered by the cover member C. As illustrated, the ball is gripped and compressed along a horizontal axis which extends at right angles to the longitudinal axis of the cover member C. The ball is gripped with sufficient force to distend or expand that area thereof to be covered by the cover member C an amount sufficient to cause such area to equal at least the area of the cover member C.

Figure 2:
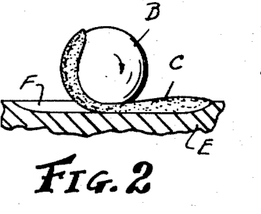
Figs. 2, 3 and 4, are diagrammatic illustrations of successive steps in my improved method of covering tennis balls, Fig. 2 illustrating the application of the first cover member, Fig. 3 illustrating the application of the second cover member, and Fig. 4 illustrating a final operation.
Figure 3:
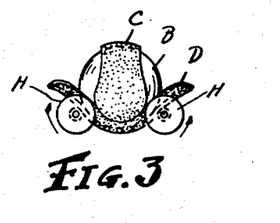

The mechanical distension or expansion of the ball also forces the ball downward against the cover C, so that when the platen E is moved in a straight line parallel with the axis of the cover member C, along the portion 45 of the cam rail 28, from the position $S^2$ to the dotted line position $S^7$, the ball will roll across the cover, and the cover will adhere to the adhesive-coated ball, as indicated in Fig. 2.

The gripping mechanism 60 which holds and expands during its rolling movement is best illustrated in Figs. 1 and 5. As there shown, the mechanism comprises a pair of bell cranks 46, pivoted as at 47 between a pair of bracket members 48 carried by an upstanding frame member 49 in the machine. The lower extremity of each of the bell cranks 46 is provided with a ball gripping member or dished disc 51 which is carried by a spindle 52. Each spindle is journaled in the arm of its respective bell crank so as to permit the ball to rotate freely as it is moved across the cover member C.

The bell cranks 46 are moved from the dotted line, or idle position shown in Fig. 5, to the full line, or active position, by a hydraulic mechanism. This mechanism comprises a cylinder 52 secured to the upper end of the frame member 49, and having its axis positioned in alignment with the ball B. The cylinder 52 which rests on the platen E in position at station $S^2$ is provided with a piston 53 which is connected by a piston rod 54 to one end of each of a pair of links 55. The other ends of these links are pivotally connected as at 56 to respective bell cranks 46.

Figure 16:
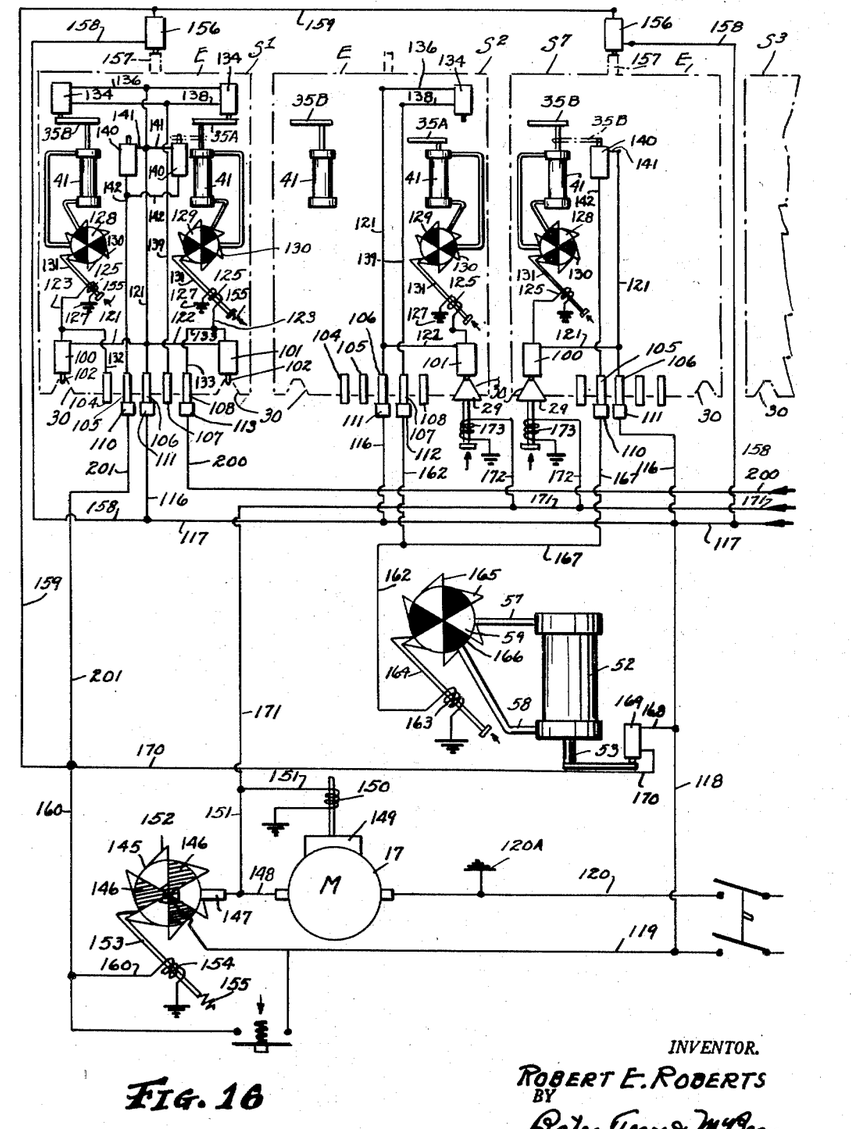
Figs. 16 and 17 together comprise an electrical diagram illustrating the manner of controlling the timing of the operation of the apparatus shown in Fig. 1.

Suitable fluid connections 57 and 58 interconnect opposite ends of the cylinder 52 with a reversing valve mechanism diagrammatically indicated in Fig. 16 at 59. This valve controls the gripping movement of the mechanism 50, and in turn is controlled by an electric circuit as will hereinafter be more fully described. Suffice it, at this time, to say that the arrangement is such that when a platen E reaches the position $S^1$ the clamp 35 is withdrawn from engagement with the ball B and the mechanism 50 is operated to clamp the ball firmly and distend or expand it as heretofore described.

After the ball B has been gripped by the mechanism 50, the spider 14 is rotated to slide the platen E from the position $S^2$ to the dotted line position $S^7$ of Fig. 1. During this movement of the platen, the ball B is held by the rotatable cups of the gripping mechanism 50, so that a rolling action takes place between the ball and the cover member C, thus applying such cover member to the ball.

When a platen E reaches the position $S^7$, the spider is again stopped and the mechanism 50 is actuated to move the gripping members 51 from the full line position to the dotted line position (Fig. 5), thus freeing the ball from the gripping mechanism 50, whereupon a clamp 35B carried by such platen is actuated to swing into engagement with the ball and retain it in position on top of the cover member D, as indicated by the dotted line in Fig. 5. Thereupon the spider 14 is operated to swing the platen E from the station $S^7$ to the station $S^3$.

The station $S^3$ is an idle station, and when in this position the ball has had the cover C applied thereto and is held on the center of the cover member D by the clamp 35B so that the cover member D is accurately aligned with the uncovered portion of the ball. The platen E remains at station $S^3$ until the operations being performed at the other stations have been completed after which the platen is advanced from the station $S^3$ to the station $S^4$.

The second cover member D is applied to the ball while it is at station $S^4$. The mechanism for performing this operation is best shown in Figs. 1, 6 and 7. This mechanism is generally indicated at 60 and is similar to that heretofore described in connection with the gripping mechanism 50. The mechanism 60 is provided with a pair of bell cranks 61 which are pivoted as at 62 to bracket formation 63. Rigidly fixed to the lower ends of each bell crank 61 is a ball-gripping member 64. These members, unlike those of the mechanism 50, are rigidly secured to their bell cranks, so as to prevent any rotative movement of the ball while gripped thereby.

The gripping mechanism 60 is actuated by a hydraulic cylinder 65 which is supported by a frame member 66, in alignment with the ball B which rests on the platen E which is at station $S^4$. The cylinder 65 is provided with a piston 67 which is connected to a piston rod 68, the lower end of which is pivotally connected to one end of each of a pair of links 69. The other ends of these links are pivotally connected, as at 70, to their respective bell cranks 61. When pressure is applied to the upper end of the cylinder, the grippers 64 are moved into engagement with the ball with sufficient pressure to expand or distend those areas of the ball to which the cover member D is to be applied, and at the same time retain the ball on the platen E and in engagement with such cover member.

After the ball has been firmly gripped and expanded by the mechanism 60, the cover member D is wrapped about the ball. To this end the platen E is provided with a pair of slotted openings 71 beneath the cover member D and through which a pair of concave rollers H pass. The rollers H are carried on a pair of spaced arms 72 which are pivoted as at 73 to a cross arm 74 carried by a piston rod 75 of a hydraulic cylinder 80. The rollers H are resiliently urged toward each other by a pair of springs 76 which are interposed between the lower end of the levers 72 and the rod 75 so that as the rollers rise they will firmly press the cover D against the ball. Fluid is admitted to the cylinder 80 through suitable conduits 81 and 82 to control the operation of raising and lowering the rollers 96 as desired.

Following the wrapping of the cover D about the ball by the upward movement of the rollers H, the rollers are lowered to the position shown in Fig. 7, and the gripping mechanism 60 is actuated to release the ball, whereupon a ball clamp 35B is actuated to clamp the ball in position on the platen E. After the ball has been clamped on the platen, the spider 14 is actuated to move the platen E from station $S^4$ to station $S^5$.

At station $S^5$ the ball B is expended in an equatorial mold which crosses the seam lines N to insure the removal of any wrinkles and to insure the firm attachment of the edges of the cover to the ball. This is accomplished by moving an ironing ring 83 (Fig. 4) down about an equatorial zone of the ball, thus expanding the ball into the ironing ring. The inner sperical seat of the ring 83 is of such size that the ring may pass freely over the ball before the ball is expanded, by the action of the plunger 84.

Both the plunger and the ring are thereupon withdrawn, freeing the ball for further movement.

In the operation just outlined, when the platen E reaches the station $S^5$ the ball clamp 35B of that platen is actuated to release the ball, whereupon a hydraulic mechanism is energized to move the ironing ring 83 into position. This mechanism is best shown in Figs. 1, 4 and 8. As there shown, a cylinder 85 is attached to the upper end of a frame member 86, and has its piston rod 87 connected to a cross arm 88 to which the ironing ring 83 is secured by suitable spacing bolts 89. The plunger 84 is attached to the piston 87 and extends below the cross arm 88 so as to engage the ball shortly before the ironing ring is completely seated.

If desired, the ironing ring 83 may be provided with suitable downwardly extending lugs (not shown) to engage the platen E and a spring (not shown) interposed between the cross arm 88 and the piston rod 87 so that the ironing ring will be completely seated before the lower end of the rod or the plunger 83 coacts with the ball to expand it.

After the ball has been acted upon by the ironing ring 83, the ring is raised to the position shown in Fig. 8, and the clamp 35B again moved into position to retain the ball on the platen E, whereupon the platen is advanced to station S⁶.

The ball is ejected from the platens E at station S⁶. After each platen E comes to rest at this station the clamp 35B is swung to its idle position, freeing the ball, whereupon the ball is removed from the platen. The ball may be removed by any suitable mechanical means, such as, for instance, a wheel diagrammatically illustrated in Fig. 17 at 90. This wheel is provided with a series of radially extending arms 91 which engage the ball as the wheel is rotated about its axis 92. The wheel is mounted on a suitable frame member (not shown) so that it is positioned above the path of the platens at station S⁶. The wheel is actuated in timed relation with the progress of the platens, as will become apparent from the electrical diagram of Figs. 16 and 17, and the description thereof.

Figure 17:
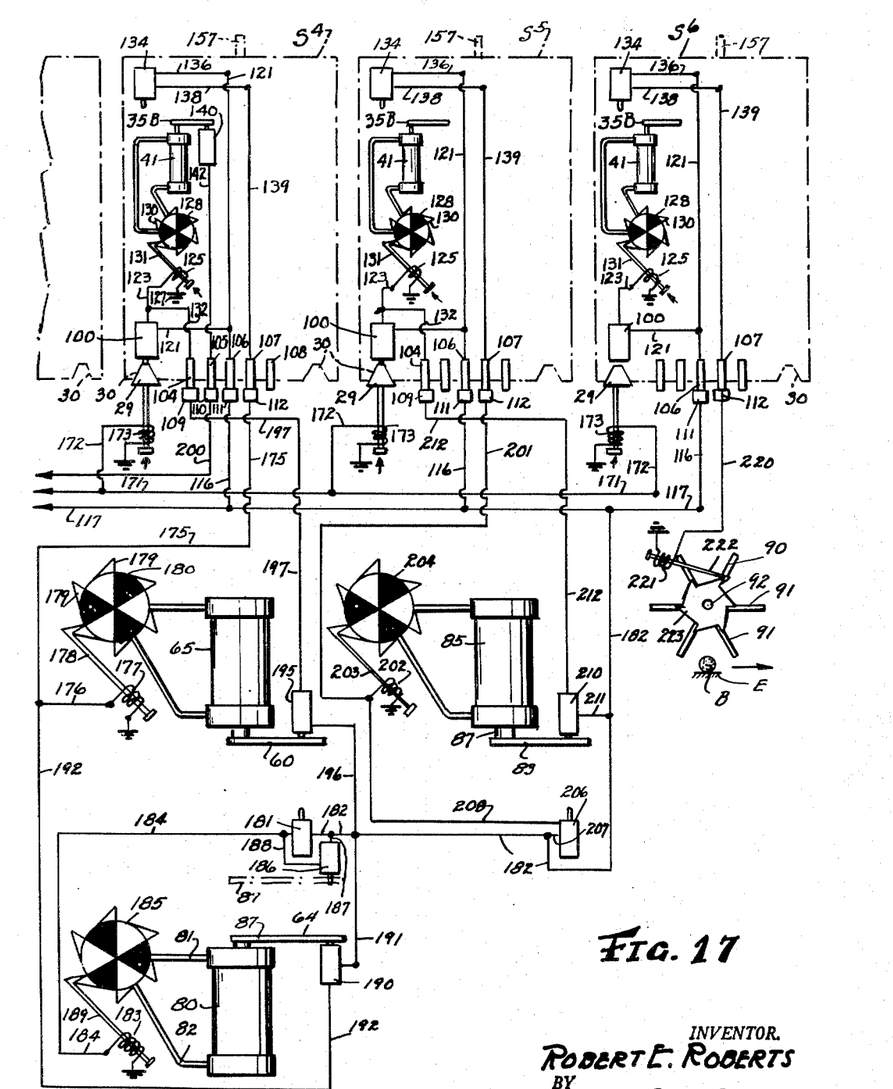

The various mechanisms which operate to affix the covers to the balls are actuated in synchronism with each other and are all controlled by an electrical circuit diagrammatically shown in Figs. 16 and 17. These figures illustrate the various mechanisms in the positions they have at the instant of the stopping of the platens E. Fig. 1 likewise illustrates the mechanisms in such position.

Referring to the diagram, which comprises the two Figs. 16 and 17, I have indicated the various stations of the platens E by the characters S¹, S², S⁷, S³, S⁴, S⁵, S⁶, respectively. The mechanism and circuits within the dotted lines representing station S¹, and carried by each platen, although only such elements are illustrated within the dotted lines indicative of the remaining sections as are active when a platen E is at that station.

Referring to Fig. 16, it will be noted each platen E is provided with a pair of indexing recesses 30, associated with each of which is an electric switch 100 or 101. These switches (as well as the other electric switches hereinafter to be referred to, unless otherwise qualified) are of a type which, when a spring-pressed plunger 102 thereof is engaged, cause an electrical circuit to be made and immediately broken, the circuit remaining broken as long as the plunger is depressed and until the plunger is again actuated. As these switches are well known, no specific description of them is deemed necessary.

Also associated with each platen E are five electrical contactors 104, 105, 106, 107, and 108. These contactors are arranged to engage contacts 109 (Fig. 1) which are carried by a stationary frame member 10. These contactors 104 to 108 inclusive, are preferably mounted in a housing 114 (Fig. 1) secured to the side of each sprocket arm 15 and hence rotate with the respective platens. Suitable flexible conduits connect the contacts 104 to 108 with the various mechanisms carried by the platens E.

Each platen E is supplied with electric power through its contactor 106, which, when a platen is in position at any of the stations S¹ to S⁷ inclusive, coacts with a stationary contactor 111. The contactors 111 (Figs. 16 and 17) are each connected by a line 116 with a line 117 which, in turn, is connected to one side of a power line 119 by a line 118. The other side 120, of this power line, is grounded to the frame of the machine, as indicated at 120A. Each platen is also grounded to the frame.

The contactor 106 of each platen is connected to the switches 100 and 101 by lines 121 and 122. The other terminals of the switches 100 and 101 are connected by lines 123 with respective solenoids 125, the other pole of which is grounded as indicated at 127.

The solenoids 125 of each platen E operate respective reversing valves 128 and 129 carried by such platens. The reversing valves act to reverse the flow of fluid to the respective cylinders 41, which actuate the clamping mechanisms 35A and 35B of the platen, with which the reversing valves are associated.

The reversing valves are indicated generally in Figs. 16 and 17 at 128 and 129. These valves are of a type wherein a partial rotation of a valve member causes a reversal of the flow of fluid to the cylinders 41 with which they are associated. The valve may be provided with a ratchet wheel, indicated generally at 130 in Figs. 16 and 17. Each ratchet wheel may be operated by a pawl 131 which, in turn, is actuated by its respective solenoid 125. The result is such that each actuation of a switch 100 or 101 causes a reversal of the flow of fluid through the valve and thus controls the position of the clamps 35A and 35B which are connected to the piston rods of the associated cylinders 41.

The solenoids 125 are also arranged to be energized by a circuit external of the platen E upon which they are mounted. For this purpose the contactors 104 and 108 are connected to the respective solenoids 125 by lines 132 and 133 respectively. Thus the clamps may be operated in timed relationship with mechanism carried by other platens, as will be hereinafter more fully described.

The movement of the clamps 35A or 35B, either to their active position (indicated at dotted lines in Fig. 16), or their inactive position (indicated in full lines in Fig. 16), controls the operation of other mechanisms as hereinafter to be more fully described. When either clamp 35A or 35B moves to an inactive position (shown by full lines in Fig. 16) it contacts a switch 134. For convenience two such switches 134 are shown for each platen E, one for each for the clamp 35A and the other for each clamp 35B. The switches 134 are connected to the power line 121 of the platen by lines 136, and to the contactor 107 by lines 138 and 139.

It follows from the above-described circuits, that, whenever either of the clamps is raised to its inactive position, a switch 134 is rendered active to energize the contact 107. Similarly, the movement of either of the clamps 35A or 35B to its active or clamping position (indicated in dotted lines in Fig. 16) actuates one of a pair of switches 140. The switches 140 are each connected to the power line 121 of the platen by lines 141. The switches 140 are likewise connected by lines 142 with the contactor 105 heretofore described; hence, whenever a clamp is moved to its active position (dotted line position in Fig. 6), the contactor 105 is momentarily energized.

As heretofore mentioned, the spider 14 is rotated by the motor 17. This motor is controlled by a rotary switch 145 having alternate segments 146 which are connected with the power line 119. When any of these segments 146 are brought into contact with a stationary contactor 147, which is connected by a line 148 with the motor 17, the motor will be energized. Simultaneously with the application of power to the motor 17, a brake 149, is withdrawn from the motor by solenoid 150. One terminal of the solenoid 150 is connected by lines 151 with the contactor 147. The motor switch 145 is provided with a ratchet wheel 152 arranged to be actuated by a pawl 153 which, in turn, is actuated by a solenoid 154. The pawls 153, as well as the pawls 131 heretofore mentioned, are automatically returned to their normal positions (shown in Fig. 16) by suitable springs 155.

The movement of the spider 114 is stopped each time a platen is brought into the positions $S^1$ or $S^7$. At each of these positions a switch 156 is mounted on the frame. These switches are arranged to be engaged by lugs 157 carried by the respective platen E, and when so engaged serve to energize the motor switch solenoid 154 to move a segment 146 thereof out of contact with the stationary contactor 147, as shown in Fig. 16.

The switches 156 are each connected by a line 158 with the power line 117, and by lines 159 and 160 with one terminal of the solenoid 154, the other terminal of which is grounded. The mechanism for initiating the movement of the spider 14 is dependent upon the completion of the operations performed at the various stations and will be hereinafter described.

Assuming the covers C and D together with the ball B, have been placed on the platen at station $S^1$, the ball clamped in place, and assuming that such platen is moving toward station $S^2$, then the platen will be stopped when it reaches the latter station by actuation of the stopping switch 156 at station $S^1$. This switch is contacted by the next succeeding platen E as soon as the advance platen reaches station $S^2$. A latch 29 carried by the frame at station $S^2$, enters an indexing recess 30, associated with the platen at station $S^2$, whereupon the switch 101 of such platen is actuated to cause the clamp 35A to be moved out of contact with the ball B, as heretofore explained.

When the clamp 35A is raised to an inactive position, it will actuate the associated switch 134, thus momentarily energizing the platen contactor 107. The contactor 107 is in electrical contact with a frame contact 112 which, at station $S^2$, is connected by a line 162 with one terminal of a solenoid 163, the other terminal of which is grounded. The actuation of the solenoid 163, by reason of the raising of the clamp 35A at station $S^2$, causes the cylinder 52 to lower the clamping mechanism 53 to cause it to grip the ball.

The energization of the solenoid 163 actuates a pawl 164, which coacts with a ratchet 165 of a reversing valve 166. This valve controls the direction of flow of fluid to the cylinder 52 which actuates the ball-gripping mechanism 50 heretofore described. The reversing valve 166 and its associated mechanism is similar to that heretofore mentioned in connection with the cylinders 41 of the platen clamping members, the arrangement being such that the flow of fluid is reversed each time the solenoid 163 is energized.

After the clamping mechanism 50 has been actuated to grip the ball, the platen is moved from the position $S^2$ to the intermediate position $S^7$. The mechanism for initiating the movement of the spider 14 to advance the platens E will be hereinafter described. However, as a platen is moved from the position $S^2$ to the position $S^7$, the ball is rolled across the cover C. Thus the cover is fully applied when the platen reaches station $S^7$, and the ball is in position on the cover D, as indicated in Fig. 7.

As the platen E approaches the station $S^7$, the contactor 157 thereof engages the motor stopping switch 156, which is carried by the frame of the machine at station $S^7$. The actuation of this switch 156 operates the motor switch 146 to stop the motor 17. A brake 149 acts on the motor or gear reduction unit to stop immediately the movement of the spider 14. When the platen reaches station $S^7$, the indexing plunger 29 associated with that station engages a recess 30 associated with the platen at such station and properly aligns the platen and locks it in position.

As the plunger 29 coacts with the indexing recess 30 at station $S^7$, it engages the switch 100 of the platen, thereby causing the solenoid 125 of such platen to actuate its reversing valve 128, and cause its clamp 35B to move from the inactive position, shown in full lines, to the active position shown in dotted lines in Fig. 16. The movement of the clamp 35B to its active position operates the switch 140 associated therewith, momentarily energizing the contactor 105 of such platen. The contactor 105 coacts with a stationary frame contact 110 which, at station $S^7$, is connected by a line 167 with the line 162 of the solenoid 163 which actuates the reversing valve 166.

The actuation of the reversing valve 166 reverses the flow of fluid to the cylinder 52, thus raising the gripping mechanism 50. As the gripping mechanism rises, it coacts with a switch 169 to close it. One terminal of this switch is connected by lines 168 and 119 with the power line 118, and the other terminal is connected by lines 170 and 160 with the solenoid 154 of the motor switch 146. The closing of this switch causes a momentary energization of the solenoid 154, thereby moving a segment 146 of the switch 145 into engagement with the stationary contactor 147 of the motor 17, thus releasing the brake 149 and energizing the motor. The actuation of the switch 145 also causes the withdrawal of the indexing plunger 29.

As shown in Fig. 16, the stationary contactor 147 of the switch 145 is connected by lines 171 and 172 with one terminal of a solenoid 173, the other terminal of which is grounded. The energization of this solenoid withdraws the indexing plunger 29, thus freeing the platen for movement.

The platen E is stopped in position at station $S^3$ by the arrival of another platen at the position $S^1$ as heretofore described. No operation is carried out on the ball at station $S^3$. The platen merely rests at this station until the operations have been completed at the remaining stations, whereupon the motor is energized, as hereinafter described, to progress the platen to station $S^4$.

When the platen reaches station $S^4$, the cover D is wrapped around the ball. The platen reaches this station with the ball, having the cover C applied thereto, in position on the cover D, which position is that illustrated in Fig. 1 at station $S^3$. As soon as the platen reaches the station $S^4$, the latch 29, carried by the frame at that station, enters the left hand (Fig. 16) indexing recess 30 of the platen, and engages the switch 100. The engagement of the switch 100 closes it and causes its associated solenoid 125 to operate a reversing valve 128 and this causes a reversal of flow of fluid in its associated cylinder 41, thereby raising the clamp 35B from the full line position to the dotted line position (Fig. 17) thus releasing the clamp from engagement with the ball.

As the clamp 35B at station S⁴ moves from its engaging to its disengaging position, it closes the switch 134 which, through the lines 138 and 139, momentarily energizes the platen contactor 107. The contactor 107 coacts with the stationary contact 112 which, at station S⁴, is connected by lines 175 and 176 with one terminal of a solenoid 177, the other terminal of which is grounded. The solenoid 177 operates a pawl 178 which coacts with ratchet teeth 179 of a reversing valve 180.

The valve 180 is of a type similar to the reversing valves heretofore described, and serves to reverse the flow of fluid to the hydraulic cylinder 65 of the gripping mechanism 60. This causes the gripping mechanism 60 to descend and engage the ball, as heretofore described. As the clamping mechanism 60 is lowered into engagement with the ball, it closes a switch 181 which is connected to the power line 117 by a line 182, and to one terminal of a solenoid 183 by a line 184.

The solenoid 183 actuates a pawl 189 which coacts with a reversing valve 185 to reverse the flow of fluid to the cylinder 80 which actuates the rollers H and thereby causes them to wrap the cover D about the ball as heretofore described.

As the piston 87 of the cylinder 80 rises to wrap the cover D about the ball, it moves from the full line position, shown in Fig. 17, to the dotted line position therein shown, and engages a switch 186. The switch 186 is connected to the power line 117 by the lines 187 and 182, and to the solenoid 183 by lines 188 and 184. Thus as soon as the rollers H have risen to their uppermost position and have wrapped the cover D about the ball, the switch 186 causes a momentary energization of the solenoid 183 which reverses the flow of fluid to the cylinder 80, thereby lowering the rollers.

As the rollers H which wrap the cover D about the ball are retracted to their normal or inactive position a switch 190 is engaged by the mechanism 64. The switch 190 is connected by lines 191 and 182 to the power line 117, and by a line 192 with the solenoid 177 of the reversing valve 180, which controls the clamping mechanism 60. Thus the solenoid 177 is again momentarily energized to cause the flow of fluid to the cylinder 65 to be reversed and the mechanism 60 to be raised from its active position to its inactive position.

When the gripping mechanism 60 reaches its inactive position, it engages and closes a switch 195. This switch is connected to the power line 117 by lines 196 and 182 and by a line 197 with the stationary contactor 109 at station S⁴. This contactor coacts with contactor 104 of its associated platen E, which in turn is connected by lines 132 and 123 with the solenoid 125 on such platen. The solenoid 125 thus is momentarily energized and acts on the reversing valve 128, which controls the flow of fluid to the cylinder 41 of the clamp 35B. This causes this clamp 35B to move from its inactive or dotted line position to its active or full line position (Fig. 17). This movement of the clamp locks the ball to the platen, and the platen then is ready to proceed to station S⁵. The movement of the clamp 35B to its active or ball-engaging position, at station S⁴, serves to actuate the clamp 35A at station S¹ to cause it to engage a ball which by this time has been placed by the operator on the platen E at that station.

Station S⁴ is used to control the operation of the clamp 35A at station S¹, because, in the mechanism shown, the operations performed at station S⁴ are greater in number and take more time than the operations performed at the remaining stations, and because it is desirable to give the operator the advantage of the maximum time interval to position the ball and covers on the platen at station S¹.

As shown in Fig. 17, the clamp 35B of the platen E in position at station S⁴ moves to its active, or full line position, and thus closes a switch 140 of such platen. This momentarily energizes the platen contactor 105, which at station S⁴ engages a stationary contact 110 which is connected by a line 200 (Figs. 17 and 16) with the stationary contactor 113 at station S¹. The contactor 113 coacts with the contactor 108 of the platen at station S¹ which is connected by lines 133 and 123 with the right hand solenoid 125.

This solenoid 125, above-mentioned, controls the operation of the clamp 35A of the platen in position at station S¹, and causes the reversal of the flow of fluid to the cylinder 41, and the movement of the clamp 35A from the full line position shown at station S¹ in Fig. 16 to the dotted line position therein shown. The clamp 35A then engages the right hand switch 140, and through lines 142 momentarily energizes the contactor 105 of the platen E at station S¹. At this time the contactor 105 coacts with the stationary contact 110, which at station S¹ is connected by lines 201 and 160 with the solenoid 154, which operates the reversing switch for the motor M. This causes the switch to move from the inactive position shown in Fig. 16 to an active position and initiates the action of the motor, releases the motor brake 149, and moves any of the latch members 29, which may be in engagement with the latching recesses 30 of their respective platens, out of engagement therewith.

As shown in Fig. 17, the motor contactor 147 is connected with the solenoids 173 of each of the latch members 29 by the lines 151, and 171 and 172. Accordingly, the spider 14 moves to advance the platens so that a different platen will be brought into the intermediate position S⁴, and, as soon as the various operations performed at this station have been completed, the motor is again rendered active and the spider 14 moved again to index the platens.

From station S⁴ a platen is moved to station S⁵, at which station the seams of the ball are ironed to eliminate all wrinkles. When a platen reaches the station S⁵, the motor 17 is stopped by reason of another platen having reached the station S¹ as heretofore described. The stopping of the motor releases the stationary indexing latch 29 at station S⁵ for cooperation with the associated indexing recess 30 of the platen which is at S⁵. This latch 29 coacts with the switch 100 causing the clamp 35B to be raised from its active to inactive position, thus releasing the ball.

As the clamp 35B, at station S⁵, moves to its releasing position, it coacts with a switch 134, causing the contactor 107 of such platen to become momentarily energized. This contactor is in connection with a stationary contactor 112 positioned at station S⁵, which is connected by a line 201 with one terminal of a solenoid 202, the other terminal of which is grounded. This solenoid actuates a pawl 203 which coacts with a fluid reversing valve 204, in the manner heretofore described in connection with other fluid reversing valves, thereby causing a reversal of the flow of fluid in the cylinder 85, thereby lowering the ironing ring 83 as heretofore described.

As the ironing ring 83 reaches its lowermost position it engages a switch 206. This switch is connected to the power line 182 by a line 207 and by a line 208 with the solenoid 202 heretofore described. When the piston rod 87 of the ironing ring 83 reaches its lowermost position, the solenoid 202 is energized to reverse again the flow of fluid to the cylinder 85 and raise the ironing ring away from the ball.

When the ironing ring 83 rises to its normal or inactive position it contacts a switch 210 which is connected by lines 211 and 182 with the power line 117, and by a line 212 with the stationary contact 109 at the station S⁵ which coacts with the contactor 104 of the platen at such station. This returns the clamp 35B to its active or ball-clamping position. The platen then is again ready to be moved.

The platen is moved from station S⁵ with the completion of operations at station S⁴, as heretofore described, and thus comes into the position at station S⁶. The platen is stopped at this station, as heretofore described, and, as it stops, the latch 29 of station S⁵, coacts with the associated indexing notch 30 to position the platen. The switch 100, as heretofore described, now actuates the clamp 35B to move it to an inactive position. When the clamp 35B is moved to its inactive position at station S⁶ it contacts a switch 134 and momentarily energizes the contactor 107 of the platen. At station S⁶, the contactor 107 coacts with a stationary contact 112 which is connected by a line 220 with one terminal of a solenoid 221 the other terminal of which is grounded. The solenoid 221 actuates a pawl 222 which coacts with a ratchet 223, carried by the ejector wheel 90, to cause the ejector wheel to make a partial rotation, and thus eject the ball from the machine. The platen is moved from station S⁶ at such time as the operations at station S⁶ have been completed.

If desired an interlocking arrangement may be provided to insure the completion of operations at each station prior to the initiating of the movement of the platen. However, in the embodiment shown, each of the fluid conduits leading to or from the various hydraulic cylinders may be provided with a regulating valve to control the rate of flow of fluid to and from its respective cylinder and thereby control the timing of the mechanism so as to insure the completion of all operations at each position prior to the completion of operations at station S⁴.

I have described in detail the switches and circuits and other electrical mechanism illustrated in the diagram, Figs. 16 and 17. It is to be understood, however, that such electric controlling features may be varied considerably from that shown to accomplish the desired result of coordinating the actions at the various stations to produce a complete automatic operation from the time the ball and covers are put in place at station S¹ to the discharge of the completed ball at station S⁶. With my machine, I prefer to use two operators, one primarily in charge of placing the covers and ball in position at station S¹, the other in charge of removing the covered balls or taking charge of them if they are automatically removed. If desired, the operator in charge of removal may do some of the work of placing the covers or ball.

It will be seen that the machine is entirely automatic, and that it operates to place each of the figure-eight covers about an expanded region of the ball, so that the covers may be full-size and still be placed without interference with each other. Moreover the rolling action of placing the covers on the ball prevents the entrapping of air under the cover. Following the placing of the covers, the ball ordinarily will be vulcanized in the usual vulcanizing mold having spherical cavities snugly embracing the covers. It is not necessary, however, to have the vulcanizing surface press the ball to the extent heretofore used in ironing out hand applied covers and thus I am able to preserve the original nap on the covers.

I claim:

1. An apparatus for applying flexible cover members to a ball, said apparatus comprising a platen adapted to support the ball and a pair of cover members, mechanism to grip the ball and hold it in contact with the first cover member, mechanism to cause a relative rolling action between the ball and first cover member while maintaining contact therebetween and mechanism for thereafter applying the second cover member to the ball.

2. An apparatus for applying a pair of flexible cover members to a ball, one of which is precoated with tacky adhesive, said apparatus comprising a platen adapted to support the cover member in a substantially flat position, two freely rotatable axially aligned devices to grip the ball and hold it in contact with said cover member, and means to advance the platen and cause a relative rolling action between the ball and cover member merely by frictional contact therebetween.

3. An apparatus for applying a flexible cover to a ball, either the cover or the ball being precoated with tacky adhesive, said apparatus comprising a platen adapted to support the cover member in a substantially flat position, means to expand an equatorial zone of the ball, and means to cause a relative rolling action between the ball and cover while maintaining contact between the expanded zone and the cover.

4. An apparatus for applying a flexible cover to a ball, comprising a platen to support a pair of cover members, means to grip the ball at opposed polar regions and retain the ball in contact with one cover member resting on said platen while permitting rotation of the ball about an axis extending through said polar regions, means to move said platen relative to said ball to thereby cause the ball to roll across said cover member, means to hold the ball stationary relative to the platen, and means to apply the second cover member while the ball is so held.

5. An apparatus for applying a flexible cover member having a coat of tacky adhesive to a ball, comprising a platen to support the cover member in a substantially flat position, means to grip the ball at opposed polar regions and retain the ball in contact with a cover member resting on said platen while permitting free rotation of the ball about an axis extending through said polar regions, means to move said platen relative to said ball and by frictional contact therewith to cause the ball to rotate and thus have a rolling action across the cover, whereby the cover member will be caused to adhere to the ball.

6. An apparatus for applying a flexible cover member to a ball, comprising a platen to support the cover member in a substantially flat position, means to expand an equatorial zone of a ball, means to move the expanded region of the ball into contact with the cover, means to cause a relative rolling action between the ball and the platen to roll the expanded zone lengthwise along the cover.

7. An apparatus for applying a pair of elongated flexible cover members to a ball, comprising a platen having a pair of recesses each adapted to receive a cover member and one recess extending transversely of the other and beyond one end thereof, means to grip a ball and hold it in contact with a cover member in the first recess, means to cause a relative rolling movement between the gripping means and the platen in the direction along the first cover member and come to rest on a mid-point of the second cover member, and means acting thereafter to press the second cover member into contact with the ball.

8. An apparatus for applying a pair of elongated flexible cover members to a ball, comprising a platen having a pair of elongated recesses each adapted to receive a cover member and one recess extending at an angle to the other recess and adjacent one end thereof in the manner of a letter T, means to grip a ball and hold it in contact with the platen at the base of the T, means to cause a relative rolling movement between the gripping means and the platen in a direction along the leg of the T to thereby cause the ball to roll across the cover forming the leg of the T, means to stop the rolling action with the ball at rest on a mid-point of the cover forming the head of the T, and means acting thereafter to press the cover forming the head of the T into contact with the ball.

9. An apparatus for applying an elongated flexible cover member to a ball, comprising a platen having a recess adapted to receive a cover member said recess being concave in a direction transverse of the cover, means to grip a ball with sufficient force to force the ball into contact with the platen, means to cause a relative rolling movement between the gripping means and the platen in the direction of the longitudinal axis of the cover to thereby cause the ball to roll across the cover.

10. An apparatus for applying a pair of elongated cover members to a ball, comprising means to support a pair of cover members, means to roll a ball across one of said cover members, and means acting thereafter to roll the other cover member onto the ball.

11. An apparatus for applying a pair of elongated cover members to a ball, comprising means to support a pair of cover members in the position of a letter T, means to roll a ball across the cover member forming the shank of the T and bring it to rest at the center of the cover member forming the head of the T, and means acting thereafter to roll the latter member onto the ball.

12. An apparatus for applying a pair of elongated cover members to a ball, comprising means to support a pair of cover members, means to roll a ball across one of said cover members, means acting thereafter to roll the ball onto the second cover member, and means to wrap the second cover member above the ball.

13. In an apparatus for applying a pair of elongated figure 8-shaped cover members to a ball, means to support said cover members, means to grip a ball, means to cause the gripped ball to roll across one cover member and onto the second cover member to apply said first named cover member to the ball, means to cause said gripping means to release said ball, a second gripping means to grip the ball in the region of said applied cover, and means to apply the second cover member to the gripped ball.

14. In an apparatus for applying a pair of elongated figure 8-shaped cement coated cover members to a ball, means to support said cover members, means to grip a ball, means to cause the gripped ball to roll across one cover member and onto the second cover member to apply said first named cover member to the ball, means to cause said gripping means to release said ball, a second gripping means to grip the ball in the region of said applied cover, means to apply the second cover member to the gripped ball, and means to eject the covered ball from the apparatus.

15. In an apparatus to apply a cover member to a resilient ball, a support adapted to support a flexible cover member, a pair of pivoted clamping members disposed above said support, each clamping member having a rotatable ball-engaging member thereon, means to swing said clamping members into engagement with the ball, a guideway for said support, and means to move the support along the guideway to cause a rolling action between the ball and said cover member.

16. In an apparatus to apply a tacky adhesive coated cover member to a resilient ball, a support adapted to support a flexible cover member in a substantially flat position and having a pair of recesses extending therethrough and covered by said cover member, a pair of clamping members disposed above said support each clamping member having a ball engaging member thereon, means to swing said clamping members into engagement with the ball, and means positioned below the support and adapted to be projected through said recesses to wrap said cover member about said ball.

17. In an apparatus for applying a cover member to a resilient ball, means adapted and arranged to engage opposite polar regions of the ball to compress the ball with sufficient force to expand an equatorial zone of the ball intermediate the polar regions, and means to apply a cover to said equatorial zone while so expanded.

18. In an apparatus for applying a tacky adhesive coated cover to a resilient ball, means adapted and arranged to engage opposite polar regions of the ball to compress the ball with sufficient force to expand an equatorial zone of the ball intermediate the polar regions, and means to apply a cover to the expanded region of the ball, and means acting thereafter to release the compression means.

19. In an apparatus for applying a pair of cover members to a resilient ball, means adapted and arranged to engage opposite polar regions of the ball to compress the ball with sufficient force to expand an equatorial zone of the ball intermediate the polar regions, means to apply a cover member to the ball while so expanded, means acting thereafter to release the compression means, means to engage polar regions of the ball to expand an equatorial zone of the ball at right angles to the first named zone, and means to apply the second cover member to the last named equatorial zone of the ball.

20. In an apparatus for applying covers to a ball, a movable platen adapted to receive a ball and a cover member, a circuitous guide for said platen, means to progress the platen along said guide, and means to grip a ball positioned on a platen and hold it for rotation about an axis parallel with the surface of said platen, whereby the movement of the platen will cause a rolling action between the ball and cover to cause the cover to be picked up by the rotating ball.

21. In an apparatus for applying covers to a ball, a plurality of movable platens each adapted to receive a ball and a cover member, a circuitous guide for said platens, means to progress the platens along said guide, means stationarily mounted relative to said guide to grip a ball positioned on a platen and hold it for rotation about a relative stationary axis parallel with the surface of said platen and in contact with a cover member on said platen, and means to progress the platen along the guide to cause a rolling action between the ball and cover whereby the cover will be picked up by the rotating ball.

22. In an apparatus for applying covers to a ball, a circuitous guide, a platen movable along said guide, a plurality of stations located around said guide, means to progress the platen from one station to another said platen being arranged and adapted to receive a ball and a pair of cover members, means at one of said stations for gripping the ball in a manner to permit its rotation about an axis transverse of the direction of platen movement, whereby movement of the platen along said guideway will cause a rolling contact between the ball and one of said cover members to cause said cover member to adhere to the ball, and means at another of said stations to apply the second cover member to the ball.

23. In an apparatus for applying covers to a ball, a circuitous guide, a plurality of platens movable along said guide, a plurality of stations located around said guide, means to intermittently progress the platens from one station to another, each of said platens having means arranged and adapted to receive a ball and a pair of cover members, means at one of said stations for gripping the ball and permitting rotation of the ball about an axis substantially parallel with the plane of movement of the platens and substantially at right angles to such movement, whereby movement of the platen along said guideway will cause actual rolling contact between the ball and one of said cover members to cause said cover member to adhere to the ball, and means at another of said stations to apply the second cover member to the ball.

24. In a ball covering apparatus, a frame, a platen movably mounted on said frame, a plurality of work stations on said frame, said platen including means to clamp a ball thereto and means to position a flexible cover member, means controlled by the movement of the platen from one station to another to actuate said clamp, whereby the ball may be retained on said platen during the movement thereof, and means to intermittently progress the platen from one station to another.

25. In a ball covering apparatus, a frame, a plurality of platens movably mounted on said frame, a plurality of work stations on said frame, each of said platens including means to clamp a ball thereto, and a recess adapted to receive a flexible cover member, and means controlled by the movement of the platen from one station to another to actuate said clamp, whereby the ball may be retained on said platens during the movement thereof, and means to progress the platens from one station to another.

26. In a ball covering apparatus, a frame having a plurality of spaced work stations, a plurality of movable platens mounted on said frame, each platen being arranged and adapted to receive a ball and a pair of cover members, means at one of said stations to grip a ball for rotation about an axis substantially parallel with the plane of movement of said platens and at right angles to the direction of such movement, means to intermittently advance the platen from one station to another, said gripping means being active to retain the ball gripped until it has rolled across one of said cover members into position on the other cover member, means acting thereafter to release said gripping means, and means positioned at another station for applying the other cover member to the ball.

27. A ball covering apparatus, a frame, a platen movably mounted on said frame, said frame having a plurality of work stations, means to progress the platen from one station to another, means to apply one cover member to the ball while the platen is moving between said stations, and means at another station to apply the second cover to the ball while the platen is stationary.

28. In an apparatus for applying flexible cover members to a resilient ball, a movable platen adapted to carry a ball and a cover member, means to grip a ball carried by a platen and hold the ball against movement, and a pair of rollers operable to wrap a cover member carried by the platen about said ball.

29. In an apparatus for applying flexible cover members to a resilient ball, a frame having a plurality of stations thereon, a plurality of movable platen members mounted on said frame for movement from one station to another in a manner to present them to each station in succession, means at one of said stations to grip a ball carried by a platen and hold the same against movement, and a pair of rollers operable to wrap a cover member carried by the platen about said ball.

30. In an apparatus for applying a pair of cover members to a ball, a frame having a plurality of work stations, a movable platen arranged to receive a ball and a pair of cover members at right angles to each other, means to apply one of said cover members to the ball as the platen advances from one station to another, means at a subsequent station to apply the second cover to the ball, and means at a subsequent station to iron the seams of the ball.

31. In an apparatus for applying a pair of cover members to a ball, a frame, a plurality of work stations on said frame arranged in a circuit, a plurality of movable platens arranged to receive a ball and a pair of cover members, means for progressing the platens one after another around said circuit, means to apply one of said cover members to the ball as the platen advances from one station to another, means at a subsequent station to apply the second cover to the ball, and means at a subsequent station to iron the seams of the ball.

32. In an apparatus for covering tennis balls with a pair of figure 8 cover members, a frame, a plurality of work stations located in a circuit about said frame, a plurality of platen members, means for progressing them one after another about said circuit, each platen member being arranged to receive a ball and a pair of cover members arranged in the position of a letter T, means to apply the cover member forming the shank of the T to the ball as the platen progresses from one station to another, means at a subsequent station to apply the cover member forming the head of the T to the ball, means positioned at a subsequent station to iron the seams of the ball, and means at a subsequent station to discharge the ball from the platen.

33. In an apparatus for applying a pair of cover members to a ball, a frame having a plurality of successively positioned work stations, a platen adapted to receive a ball and a pair of cover members, means to progress the platen from one station to another, means to grip the ball for rotation about an axis transverse to the movement of the platen while the ball is in contact with a cover member on a platen, whereby said cover member will be applied to the ball by rolling action consequent upon movement of the cover toward the next station, means acting following the rolling of the ball on said cover member to roll the second cover member into contact with the ball, an open-ended mold having an annular equatorial cavity greater in diameter than the ball at a subsequent station, means to move said mold into an encircling position relative to the ball carried by a platen, and means to expand the ball into contact with the mold cavity to iron the seams of the previously applied covers.

34. In an apparatus for applying a pair of cover members to a ball, a frame having a plurality of successively positioned work stations, a plurality of platens movably mounted on said frame, each of said platens being arranged and adapted to receive a ball and a pair of cover members, means to progress the platens from one station to another in sequence, a hydraulic mechanism positioned at one of said stations to grip the ball for rotation about an axis parallel with and substantially at right angles to the movement of the platen to retain the ball for rotation about a fixed axis in contact with a cover member on a platen, whereby said cover member will be applied to the ball by rolling action consequent upon movement of the cover toward the next station, means acting following the rolling of said cover on the ball to release said hydraulic mechanism, hydraulically operated means at another station for subsequently gripping the ball and holding the same against the platen and against movement relative thereto, hydraulically operated means at said station to roll the second cover member into contact with the ball, an open-ended mold having an annular equatorial cavity greater in diameter than the ball at a subsequent station, hydraulically operated means to lower said mold into an encircling position relative to the ball carried by a platen, and means operated by said last mentioned hydraulic means to expand the ball into contact with the mold cavity to iron the seams of the previously applied covers.

35. In an apparatus for applying covers to a ball, a frame, a plurality of platens mounted for circuitous movement on said frame, a plurality of work stations positioned on said frame, means at respective stations to perform operations for applying a cover to a ball, each platen being arranged to receive a ball and a pair of covers, a pair of ball clamping means on each platen, each clamp being arranged to clamp a ball to the platen to retain the same in accurate position thereon, means to actuate said clamps, and interengaging means carried by the platen and the frame for releasing said clamps when a platen reaches any of said stations, and means for moving one of said clamps into engagement with the ball to clamp the same to the platen prior to movement of the platen away from each station.

36. In an apparatus for applying a pair of figure 8-shaped flexible cover members to a tennis ball, a frame, a vertically extending shaft rotatably mounted in the frame, a plurality of radially extending arms carried by said shaft, a carriage mounted for radial movement on each arm, a platen mounted on each carriage for rotation about a vertical axis, a stationary continuous guide encircling the ends of said arms, means on each of said platens to engage said guide to control the position of each platen relative to its axis and to control the radial movement of the carriage on the arms, resilient means acting on said carriage to maintain said rollers in contact with said guide, each platen being arranged and adapted to receive a ball and a cover member, means to intermittently move said shaft through a portion of a rotation, means carried by said frame and arranged and adapted to grip a ball and hold it in contact with a platen while permitting the ball to rotate about a horizontal axis, said guide having a substantially straight portion located to guide the platen in a straight line while the ball is gripped by said gripping mechanism, said line being substantially normal to the axis of rotation of the ball whereby movement of the platen along the straight portion of the guide will result in the rolling of the ball across said cover member.

ROBERT ELDON ROBERTS.

REFERENCES CITED

The following references are of record in the file of this patent:

UNITED STATES PATENTS

| Number | Name | Date |
|---|---|---|
| 1,415,438 | Gibbons | May 9, 1922 |
| 1,446,885 | De Gowin | Feb. 27, 1923 |
| 1,593,211 | Faulkner et al. | July 20, 1926 |
| 2,117,400 | Cobb | May 17, 1938 |
| 2,238,119 | Larabee | Apr. 15, 1941 |
| 2,279,921 | Humphrey | Apr. 14, 1942 |
| 2,299,544 | Humphrey | Oct. 20, 1942 |